July 30, 1963  J. T. MATSUOKA  3,099,040
DISCHARGE DOOR MECHANISM FOR MIXING MACHINE
Filed Sept. 27, 1961  2 Sheets-Sheet 1

INVENTOR.
JAMES T. MATSUOKA
BY
Williams, David, Hoffmann & Jaunt
ATTORNEYS

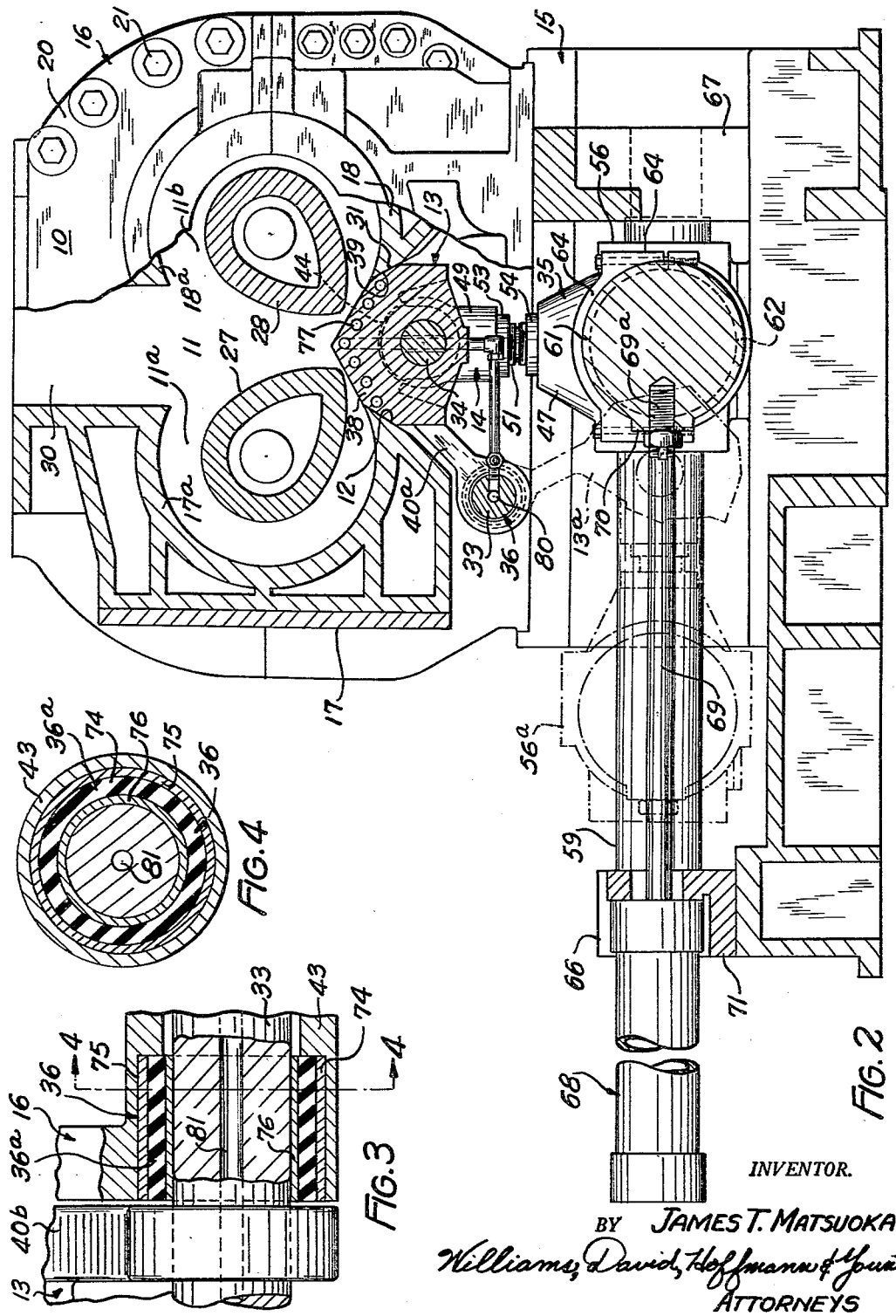

United States Patent Office 3,099,040
Patented July 30, 1963

3,099,040
DISCHARGE DOOR MECHANISM FOR MIXING MACHINE
James T. Matsuoka, Brecksville, Ohio, assignor to Stewart Bolling & Company, Inc., Cleveland, Ohio, a corporation of Ohio
Filed Sept. 27, 1961, Ser. No. 141,204
3 Claims. (Cl. 18—2)

This invention relates to a mixing machine for plastic material and, more particularly, to a novel construction for a machine of this kind having a door-controlled discharge opening leading from the mixing chamber thereof.

Plastic mixing machines having a door-controlled discharge opening have been known and used heretofore and it has been recognized that proper seating of the closure door is important for preventing leakage of material from the mixing chamber. Such proper seating is often difficult of achievement because of minor irregularities or misalignment, or because of adhering plastic material on the door or door seat. Prior attempts to achieve proper seating of the door have required the use of complex and costly mechanism which, by reason of its complexity, has not always been reliable in operation and has presented problems as to the servicing and repair thereof.

As one of its objects, the present invention accordingly provides a novel construction for a mixing machine in which a proper seating of the closure door for the discharge opening of the mixing chamber is achieved in a practical and reliable manner and by the use of mechanism requiring only a minimum number of parts.

Another object is to provide a novel construction for a mixing machine in which flexible bearing means applied to pivot shaft means of the door mechanism accommodates a limited shifting of the closure door for self-positioning thereof relative to the discharge opening upon movement of the door to its closed position.

A further object is to provide novel discharge door mechanism for a plastic mixing machine comprising a swingable door and associated pivot shaft means mounted in flexible bushing members so as to permit a limited adjusting movement of the door in response to engagement thereof with seat means adjacent the discharge opening.

Additionally, this invention provides novel discharge door mechanism for a plastic mixing machine wherein an actuating force for closing the door is applied thereto by toggle means and a limited shifting of the door for proper seating thereof is accommodated by flexing of a yieldable bearing means in the mechanism in response to the closing actuation of the door by the toggle means.

Other objects, novel characteristics and advantages of this invention will be apparent in the following detailed description and in the accompanying drawings forming a part of this specification and in which FIG. 1 is a side elevation of a mixing machine embodying the present invention, the machine being shown with certain portions broken away for clearer illustration of the discharge door mechanism;

FIG. 2 is a partial transverse vertical section taken through the machine approximately as indicated by section line 2—2 of FIG. 1;

FIG. 3 is a fragmentary sectional view on a larger scale for further illustrating the flexible bearing means of the discharge door mechanism; and FIG. 4 is another sectional view of the flexible bearing means taken on section line 4—4 of FIG. 3.

Figure 1:
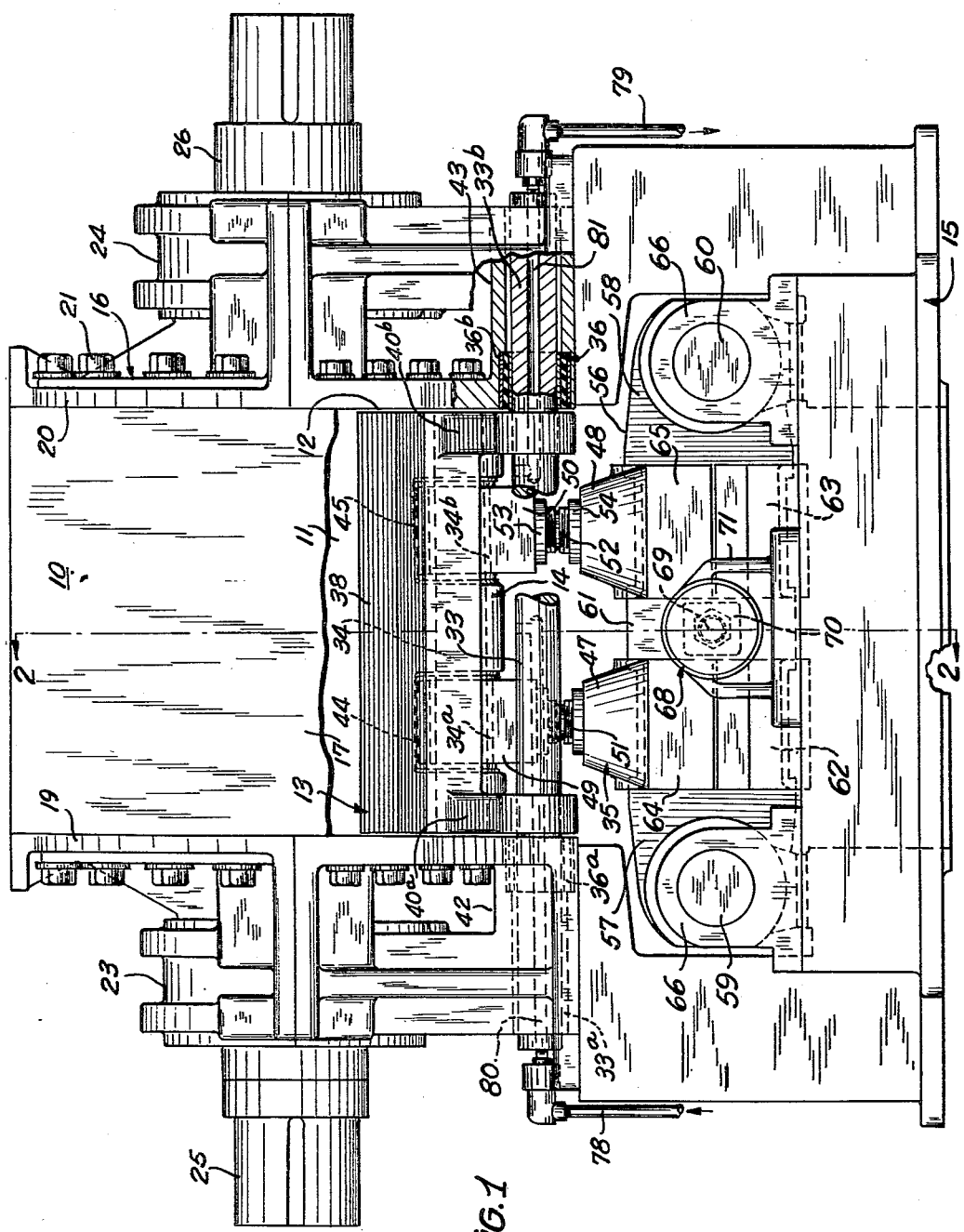

The novel construction of this invention is embodied in a plastic mixing machine 10 having a mixing chamber 11 provided with a discharge opening 12, in this case a bottom discharge opening, and a closure door 13 for closing such opening. The door 13 forms a part of a discharge door mechanism 14 to be described hereinafter.

The machine 10 comprises a base 15 and housing means 16 supported thereon and containing the mixing chamber 11. The housing means 16 is here shown as comprising pairs of side and end units 17, 18 and 19, 20 which are suitably connected as by screws or the like 21.

The side units 17 and 18 have concave wall portions 17$^a$ and 18$^a$ forming the side walls of segment portions 11$^a$ and 11$^b$ of the mixing chamber, and the end units 19 and 20 have bearings 23 and 24 thereon for supporting rotatable shafts 25 and 26 which extend into the chamber segment 11$^a$ and 11$^b$. Mixing rotors 27 and 28, operable in the chamber segments 11$^a$ and 11$^b$, are connected with the shafts 25 and 26 and are driven thereby.

The housing means 16 is provided in the upper portion thereof with an inlet passage 30 for introducing the material to be mixed into the chamber 11. The discharge opening 12 extends axially along the bottom of the mixing chamber 11 and is shown in FIG. 1 as having a length substantially equal to the space between the end units 19 and 20. The housing 16 is also provided along opposite sides of the discharge opening 12 with oppositely tapered downwardly diverging seat portions 31 which are here shown as being flat and extending substantially parallel with the rotation axes of the rotors 27 and 28.

The door mechanism 14 comprises, in addition to the closure door 13, a pivot shaft means, in this case a pair of pivot shaft members 33 and 34, and toggle means 35 for moving the door to open and closed positions and for retaining the door in the latter position. The door mechanism 14 is provided, in accordance with this invention, with flexible bearing means 36 in association with the pivot shaft means whereby the door 13 will have limited shifting, as explained hereinafter, for properly positioning thereof in the discharge opening 12 when the door is moved to its closed position.

The door 13 is of a suitable size and shape for closing the discharge opening 12 and is here shown as comprising a body 38 of a length only slightly less than the axial distance between the end units 19 and 20. The body 38 has oppositely sloping and downwardly diverging flat portions 39 along opposite sides thereof for seating engagement with the oppositely tapered seat portions 31 of the housing 16. The pairs of tapered and sloping portions 31 and 39 of the housing 16 and door 13 are disposed at a suitable angle and coverage in an upward direction so that, when the door is moved upwardly into the opening 12 to bring the sloping portions 39 thereof into wedging co-operation and seating engagement against the tapered portions 31, the door will assume a proper position for tightly closing the opening against leakage of material from the mixing chamber 11.

The body 38 is provided adjacent opposite ends thereof with a pair of mounting arms 40$^a$ and 40$^b$ which project from the body on one side thereof and extend downwardly and outwardly therefrom as shown in FIG. 2. The door 13 is swingably mounted on the housing 16 by having the arms 40$^a$ and 40$^b$ thereof connected to the pivot shaft 33 which extends axially of the housing and is disposed in an offset relation to the central vertical axis of the discharge opening 12. The shaft 33 is here shown as having the end portions 33$^a$ and 33$^b$ thereof received in oppositely extending bearing sleeve portions 42 and 43 of the housing 16. The door 13 is shown in full lines in FIG. 2 in its closed position in engagement with the seat portions 31 of the housing 16 and is shown in phantom lines only in its lowered position 13$^a$ for uncovering the discharge opening.

The body 38 is provided in the underside thereof with a pair of recesses 44 and 45 across which the pivot shaft 34 extends as a toggle shaft member. The toggle shaft 34 has the end and intermediate portions thereof suitably mounted in the body 38 so that longitudinally spaced portions of this shaft remain exposed on the underside of the body as journal portions 34ª and 34ᵇ.

The toggle means 35 includes a pair of toggle members 47 and 48 having upper bearing portions 49 and 50 on the upper ends thereof which are pivotally connected with the journal portions 34ª and 34ᵇ of the toggle shaft 34. The bearing portions 49 and 50 are connected with the toggle members 47 and 48 by spreader screws 51 and 52 having pairs of lock nuts 53 and 54 thereon and which screws provide for adjustment of the length of these toggle members.

The toggle means 35 also includes a cradle 56 having end portions 57 and 58 slidable on a pair of parallel guide rods 59 and 60. The cradle 56 includes a cylindrical connecting portion 61 extending between the end portions and providing a pair of spaced journal members 62 and 63. The lower ends of the toggle members 47 and 48 comprise lower bearing portions 64 and 65 which are pivoted on the journal members 62 and 63. The guide rods 59 and 60 are suitably supported as by having opposite end portions thereof received in pairs of brackets 66 and 67 provided on the base 15.

The door mechanism 14 also includes power means for actuating the door 13 to open and closed positions through the toggle means 35 and which power means is here shown as comprising a double-acting cylinder device 68 having a piston rod 69 projecting therefrom and connected with the cradle 56. The piston rod 69 has a threaded outer end portion 69ª engaged in a threaded opening of a boss 70 provided on the adjacent side of the connecting portion 61 of the cradle. The cylinder device 68 is adapted to be supplied with suitable pressure fluid and is mounted on the base 15 as by means of a mounting bracket 71.

When the cylinder device 68 is actuated to move the cradle 56 toward the right along the guide rods 59 and 60 to the full-line position shown in FIG. 2, the toggle members move to an upright position and, in so doing, cause the door 13 to be swung upwardly to its closed position in the discharge opening 12. When the toggle members 47 and 48 have assumed their upright position, the toggle means 35 is in a locked condition for holding the door 13 tightly closed. Actuation of the cylinder device 68 to shift the cradle 56 toward the left to its phantom-line position 56ª of FIG. 2 causes the toggle means 35 to be unlocked and to lower the door 13 to its open position 13ª.

The flexible bearing means 36 provided by this invention as an important part of the door mechanism 14 is here shown as applied to the pivot shaft 33, as mentioned above, and comprises flexible bearing means 36ª and 36ᵇ mounted in the sleeve portions 42 and 43 of the housing 16 and disposed in a surrounding relation to the end portions 33ª and 33ᵇ of this pivot shaft. Each of the flexible bearings 36ª and 36ᵇ is here shown as comprising a yieldable bushing member 74 made of rubber or the like and located between a pair of inner and outer metal bushing members 75 and 76. The yieldable bushing member 74 can be assembled between the metal bushing members 75 and 76 in a prestressed condition or, if desired, can be in a free state except for the working load imposed thereon. The yieldable bushing member 74 can be suitably bonded to one or both of the metal bushing members 75 and 76.

The yieldable bearings 36ª and 36ᵇ are here shown received in counterbores provided in the adjacent ends of the bearing sleeve portions 42 and 43. The end portions 33ª and 33ᵇ of the pivot shaft 33 are rockable in the bearings 36ª and 36ᵇ and the flexible character of these bearings provides for a limited shifting of the door 13 mainly in a direction transversely of the vertical axis of the discharge opening 13 in response to wedging co-operation of the sloping portions 39 of the door with the beveled seat portions 31 when the door is moved to its closed position. Although the shifting of the door 13 which is permitted by the yieldable bearings 36ª and 36ᵇ takes place mainly in a direction transverse to vertical axis of the discharge opening 12, limited shifting of the door is also permitted in other directions such as for correction of a tilted or cocked condition of the door.

The yieldable bushing members 74 accommodate this limited shifting of the door 13 to a sufficient extent to permit a self-adjusting movement of the door to result in a proper positioning thereof in the opening 12 to prevent leakage of material from the mixing chamber 11. The flexible bearings 36ª and 36ᵇ thus provide for a proper positioning of the door 13 in the discharge opening 12 during each closing actuation of the door by the toggle means 35, regardless of minor misalignments or irregularities in the machine 10 and regardless of the presence of solidified plastic material on the door or on the seat portions engaged thereby.

The door 13 can, if desired, be provided with suitable passage means 77 for a flow of heat-exchange medium therethrough for maintaining the door at a desired temperature. The heat-exchange medium can be supplied to, and exhausted from, the passage means 77 through supply and exhaust conduit means 78 and 79 suitably connected with axial passages 80 and 81 provided in the end portions 33ª and 33ᵇ of the pivot shaft 33.

From the accompanying drawings and the foregoing detailed description it will now be readily understood that this invention provides a novel construction for a plastic mixing machine by which proper positioning of the closure door relative to the discharge opening of the mixing chamber will be consistently achieved for reliably closing such opening by reason of flexible bearing means provided in the door mechanism to accommodate a limit-self-positioning adjusting movement of the door upon movement thereof to its closed position. It will be seen further that this reliable closing positioning of the door in the discharge opening is achieved by the use of only a minimum number of additional parts over and above the parts heretofore needed in the door mechanism.

Although the novel mixing machine closure door mechanism provided by this invention has been illustrated and described herein to a somewhat detailed extent it will be understood, of course, that the invention is not to be regarded as being correspondingly limited in scope but includes all changes and modifications coming within the terms of the claims hereof.

Having described my invention, I claim:

1. In a plastic mixing machine, housing means having a mixing chamber provided with a discharge opening, seat means on said housing adjacent said opening, a door engageable with said seat means for closing said opening and disengageable therefrom for uncovering said discharge opening, pivot means on one side of said discharge opening for connecting said door with said housing means and providing for swinging of the door toward and way from said seat means, power means connected with said door at a point of the latter spaced from said pivot means for swinging the door to open and closed positions, and flexible bushing means in said pivot means and providing for a limited self-positioning shifting of said door relative to said discharge opening in response to the power actuation of said door and a misaligned engagement of the door with said seat means.

2. A plastic mixing machine as defined in claim 1 wherein said housing means has axially aligned support openings therein on said one side of said discharge opening, said pivot means comprising shaft means having end portions thereof extending into said support openings, said bushing means comprising flexible bushing members located in said support openings and having said end portions of said shaft means mounted therein.

3. In a plastic mixing machine, housing means having a mixing chamber provided with a discharge opening, oppositely sloping beveled seat portions on said housing on laterally opposite sides of said opening, a door having oppositely sloping tapered portions engageable with said seat portions for closing said opening and disengageable therefrom for uncovering said opening, shaft means on one side of said discharge opening and having said door connected therewith for swinging toward and away from said seat portions by pivotal movement of said shaft means, said shaft means providing a pivot axis for said door substantially parallel with said seat portions, power means connected with said door other than through said shaft means and operable to swing the door to its open and closed positions, and flexible bushing means on said housing means and supporting said shaft means for said pivotal movement and also providing for a limited self-positioning shifting of said door relative to said discharge opening and transversely of said axis in response to the power actuation of said door and a wedging engagement of said tapered portions with said beveled seat portions.

References Cited in the file of this patent

UNITED STATES PATENTS

| | | |
|---|---|---|
| 1,227,522 | Banbury | May 22, 1917 |
| 1,721,288 | Thiry | July 16, 1929 |
| 1,911,440 | De Souter | May 30, 1933 |
| 2,087,254 | Herold | July 20, 1937 |
| 2,368,102 | Bowman | Jan. 30, 1945 |
| 2,504,337 | Loomis | Apr. 18, 1950 |